US007211781B2

(12) United States Patent
Hoashi

(10) Patent No.: US 7,211,781 B2
(45) Date of Patent: May 1, 2007

(54) LIGHT RECEIVER APPARATUS FOR MOBILE BODY

(75) Inventor: Yoshiaki Hoashi, Kariya (JP)

(73) Assignee: DENSO Corporation, Kariya (JP)

(*) Notice: Subject to any disclaimer, the term of this patent is extended or adjusted under 35 U.S.C. 154(b) by 141 days.

(21) Appl. No.: 11/093,163

(22) Filed: Mar. 29, 2005

(65) Prior Publication Data

US 2005/0218301 A1 Oct. 6, 2005

(30) Foreign Application Priority Data

Mar. 31, 2004 (JP) ............................ 2004-106096

(51) Int. Cl.
*H01J 40/14* (2006.01)

(52) U.S. Cl. .................................. 250/221; 250/214 R

(58) Field of Classification Search ............ 250/214 R, 250/205, 214 A; 330/59, 308
See application file for complete search history.

(56) References Cited

U.S. PATENT DOCUMENTS 5,057,694 A * 10/1991 Idaka ........................ 250/551
5,864,391 A * 1/1999 Hosokawa ................. 356/4.01
2003/0089841 A1* 5/2003 Zheng-Yi ................ 250/214 R

FOREIGN PATENT DOCUMENTS

| | | |
|---|---|---|
| JP | 7-191145 | 7/1995 |
| JP | 10-197635 | 7/1998 |
| JP | 11-23250 | 1/1999 |
| JP | 11-160432 | 6/1999 |
| JP | 2002-22827 | 1/2002 |

* cited by examiner

*Primary Examiner*—Thanh X. Luu
*Assistant Examiner*—Tony Ko
(74) *Attorney, Agent, or Firm*—Harness, Dickey & Pierce, PLC

(57) ABSTRACT

A light receiver apparatus for a vehicle comprises a photo diode for receiving an incident light form a surrounding environment, a FET connected in series with the photo diode and a filter for extracting an a.c. signal from a received light signal developed at a junction with the photo diode when a reverse-bias voltage is applied to the photo diode. The a.c. signal is produced by removing from the received light signal a signal corresponding to a background light in the incident light. The FET varies a resistance thereof in accordance with the received light signal so that a d.c. signal in the received light signal is regulated to a fixed level irrespective of the intensity of the background light in the received light.

3 Claims, 1 Drawing Sheet

LIGHT RECEIVER APPARATUS FOR MOBILE BODY

CROSS REFERENCE TO RELATED APPLICATION

This application is based on and incorporates herein by reference Japanese Patent Application No. 2004-106096 filed on Mar. 31, 2004.

FIELD OF THE INVENTION

The present invention relates to a light receiver apparatus mounted in a mobile body for detecting changes included in incident lights received from surrounding environment of the mobile body, and to various detection system using this light receiver apparatus.

BACKGROUND OF THE INVENTION

A conventional object detection system radiates a laser light and receives a reflected laser light signal to detect objects such as preceding vehicles or to measure distances to objects as disclosed in JP 2002-22827A. This system uses a light receiver circuit shown in FIG. 3, for example.

The light receiver circuit includes a photo diode 72, a grounding resistor 74, an a.c. coupling capacitor 76 and an amplifier 78. The photo diode 72 is reverse-biased and allows a current to flow in the resistor 74. This current and the voltage across the resistor 74 changes with the amount of light incident from the surrounding environment. The changes in the light signal, that is, an a.c. signal corresponding to the reflected laser light is passed to the amplifier 78 through the capacitor 76 to be amplified and then signal-processed.

If the photo diode 72 directly receives sun light, which is a background light, a large current flows in the photo diode 72. In this situation, if the resistance of the resistor 74 is large, the voltage, that is, d.c. signal, produced by the resistor 74 undesirably becomes high. As a result, the diode 72 cannot be sufficiently reverse-biased and the receiver circuit cannot operate properly to detect a changing light such as the reflected laser light in the background light.

If the resistance of the resistor 74 is small, on the contrary, the voltage produced by the resistor 74 and indicative of the background light can be held low. Changes in the light received by the photo diode, that is, a.c. signal, passed to the amplifier 78 also become small. Therefore, it becomes difficult to detect changes (reflected laser light) in the received light. Further, if the resistance of the resistor 74 is small, thermal noise increases. As a result, signal-to-noise (S/N) ratio becomes unacceptable.

SUMMARY OF THE INVENTION

It is therefore an object of the present invention to improve a S/N ratio of a light receiver circuit so changes in light may be detected accurately even if the background light is large.

According to the present invention, a light receiver apparatus for a mobile body comprises a photo diode for receiving an incident light form a surrounding environment, a resistance element connected in series with the photo diode and a filter for extracting an a.c. signal from a received signal developed at a junction between the photo diode and the resistance element when a reverse-bias voltage is applied to the photo diode. The a.c. signal is produced by removing from the received signal a signal corresponding to a background light in the incident light. The resistance element includes a semiconductor element which varies a resistance thereof in accordance with the received signal. The semiconductor element is preferably a FET.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT (Embodiment)

Figure 1:
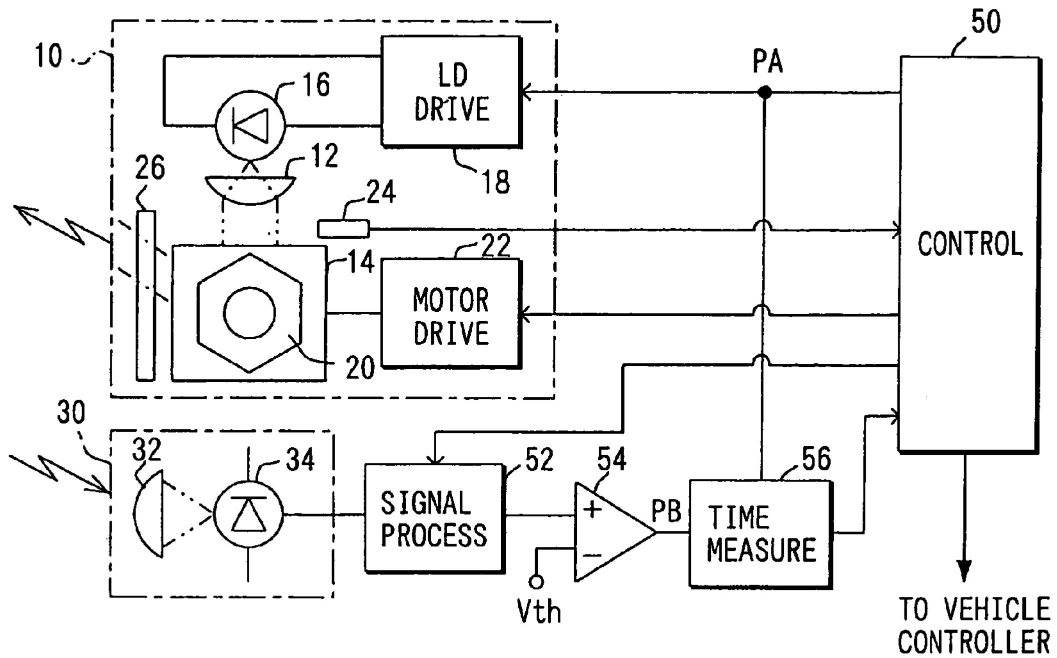
FIG. 1 is a block diagram of an object detection system according to the present invention.

Referring to FIG. 1, an object detection system is constructed with a light radiation circuit 10, a light receiver circuit 30, a control circuit 50, and the like. This system is mounted on a vehicle to detect a forward object and measure a distance to the forward object. The forward object is most typically a preceding vehicle.

The light radiation circuit 10 has a lens 12, a scanner 14 including a polygon mirror 20, a semiconductor laser diode 16, a laser diode drive circuit 18, a motor drive circuit 22, a motor position sensor 24, a glass plate 26 and the like. The drive circuits 18, 22 and the position sensor 24 are connected to a control circuit 50, which may be a programmed microcomputer. The control circuit 50 controls the light radiation circuit 10 in the known manner.

The laser diode drive circuit 18 periodically drives the laser diode 16 in response to a diode drive start signal PA from the control circuit 50, and the laser diode 16 radiates a pulse-shaped laser light through the lens 12, the scanner 14 and the plate 26. The motor drive circuit 22 drives the polygon mirror 20 to rotate about its vertical axis in response to a motor drive signal from the control circuit 50.

The position sensor 24 detects the rotational position of the motor, and the control circuit 50 controls the motor in accordance with the detected motor rotation position. The polygon mirror 20 has six inclined faces as known well to direct the laser light in different angles in both vertical and horizontal directions within respective predetermined angular ranges, thereby scanning forward areas of the vehicle.

The light receiver circuit 30 has a light collecting lens 32, a photo diode 34 and the like. The light receiver circuit 30 is connected to the control circuit 50 through a signal processing circuit 52, a comparator 54 and a time measurement circuit 56.

The light receiver circuit 30 receives at its photo diode 34 a laser light reflected by objects together with other lights such as sun light as background light, and produces a light signal indicative of the reflected light by extracting the reflected laser light component from the current flowing in the photo diode 34.

The light signal produced from the light receiver circuit 30 is level-adjusted by the signal processing circuit 52. Specifically, the circuit 52 preferably includes an AGC (auto-gain control) amplifier which automatically controls its gain so that the level of the received signal (background noise) is regulated to a certain level. The circuit 52 also preferably includes a variable gain type amplifier which operates with a small gain immediately after the laser light radiation and with an increasing gain as the time after the laser light radiation increases. Thus, the level of the received signal is regulated to an optimum.

The level-adjusted light signal is compared with a predetermined threshold Vth by the comparator 54. The comparator 54 produces a high level signal PB to indicate a reception of the reflected laser light when the input light signal reaches the threshold level Vth.

The time measurement circuit 56 receives the drive start signal PA and the comparator high level output signal PB to measure the time period ($\Delta T = PB - PA$) from the radiation of the laser light and the reception of the reflected laser light. This data indicates a distance to a preceding vehicle traveling ahead, for instance. The circuit 56 also measures the period of the comparator high level output signal PB as information of the intensity of the reflected laser light.

The control circuit 50 receives two measured time period data from the time measurement circuit 56 and the detected motor position data from the position sensor 24, and provides those data to a vehicle controller of an auto-cruise control system, an obstacle warning system or the like.

Figure 2:
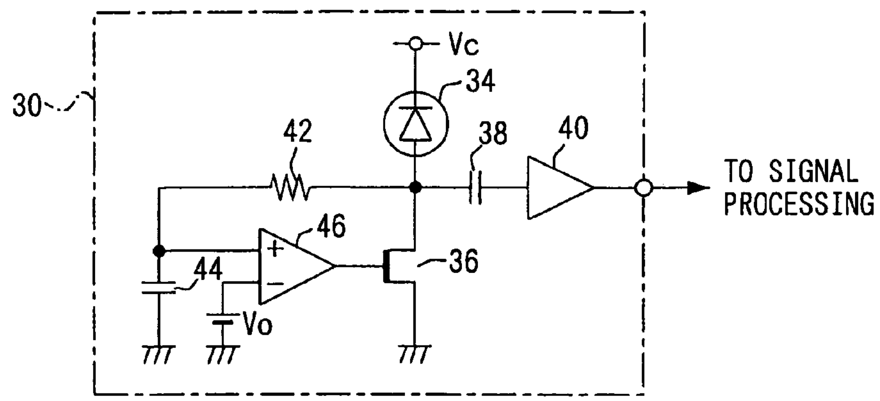
FIG. 2 is a wiring diagram of a light receiver circuit shown in FIG. 1.
Figure 3:
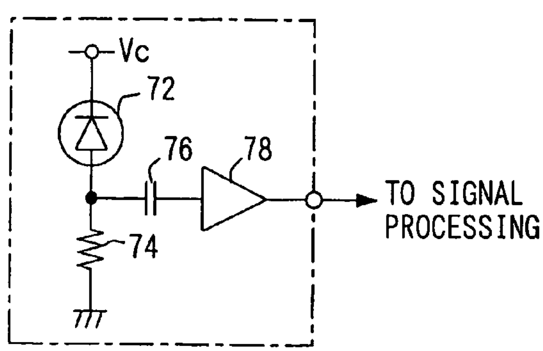
FIG. 3 is a wiring diagram of a prior art light receiver circuit.

The light receiver circuit 30 is shown in detail in FIG. 2. This circuit 30 includes, in addition to the photo diode 34, an FET (field effect transistor) 36, a capacitor 38, an amplifier 40, a resistor 42, a capacitor 44, a differential amplifier 46 and the like. The capacitor 38 operates as a first filter for cutting off a d.c. signal, and the capacitor 44 with the resistor 42 operates as a second filter (low pass filter, that is, integration circuit).

The FET 36 is connected in series with the photo diode 34. The capacitor 38 is connected to the anode of the FET 36 to pass the light signal which corresponds only to the reflected laser light. The FET 36 is provided as a resistance element of a variable resistance in place of the conventional resistor of fixed resistance. The resistance of the FET 36 varies with the output voltage of the operational amplifier 46 applied to the gate.

The differential amplifier 46 receives the voltage developed at the anode of the photo diode 34 in correspondence with the received light and averaged by the resistor 42 and the capacitor 44. This voltage varies with the background light. The amplifier 46 produces a voltage corresponding to the background light as a difference from a predetermined threshold Vo. Thus, the FET 36 is controlled to have a variable resistance so that the voltage at the anode of the photo diode 34 substantially becomes equal to the threshold Vo.

Thus, the reverse-biasing voltage applied to the photo diode 34 is held unchanged irrespective of the intensity of the background light. As a result, the light signal indicative of the reflected laser light received by the photo diode 34 can be applied to the signal processing circuit 52 as an a.c. signal properly irrespective of the background light. Further, it is possible to avoid a decrease in the S/N ratio of the light signal, which is caused if the resistance (FET 36) in series with the photo diode 34 is set small.

In the above embodiment, the FET 36 may be replaced with a bipolar transistor. The bipolar transistor, however, has a P-N junction, at which a shot noise is generated when a current flows. The photo diode also has the P-N junction and similarly generates shot noise. Therefore, the level of those noises when combined becomes 1.4 times (square sum). A FET, however, has no P-N junction and generates less noise than the bipolar transistor at the time of operation. Therefore, it is more preferred to use the FET 36 as a resistor connected in series with the photo diode 34 for an improved S/N ratio.

The positions of the photo diode 34 and the FET 36 may be exchanged.

The light receiver apparatus may be used for other systems such as a mobile communication system, which performs communication via a laser light.

What is claimed is:

1. A light receiver apparatus for a mobile body comprising:

a photo diode, mounted in the mobile body, for receiving an incident light from a surrounding environment;

a resistance element connected in series with the photo diode to produce a received light signal indicative of the incident light at a junction with the photo diode when a reverse-bias voltage is applied to the photo diode;

wherein the resistance element includes a semiconductor element which varies a resistance thereof, a filter for extracting an a.c. signal from received light signal, the a.c. signal being produced by removing from the received light signal a signal corresponding to a background light in the incident light;

another filter for extracting a d.c. signal from the received light signal; and a control means for controlling the resistance of the semiconductor element in accordance with the d.c. signal to regulate the d.c. signal to substantially fixed level.

2. The light receiver apparatus as in claim 1, wherein the semiconductor element is a FET.

3. An object detecting system for a vehicle comprising:

a light radiation means for radiating a laser light; and a light receiving means for receiving a reflected light arising from the radiated laser light and for detecting an object around a vehicle, wherein the light receiving means includes the light receiver apparatus according to claim 1.

* * * * *